J. A. McBRYDE.
Hay and Cotton Presses.
No. 148,730.    Patented March 17, 1874.
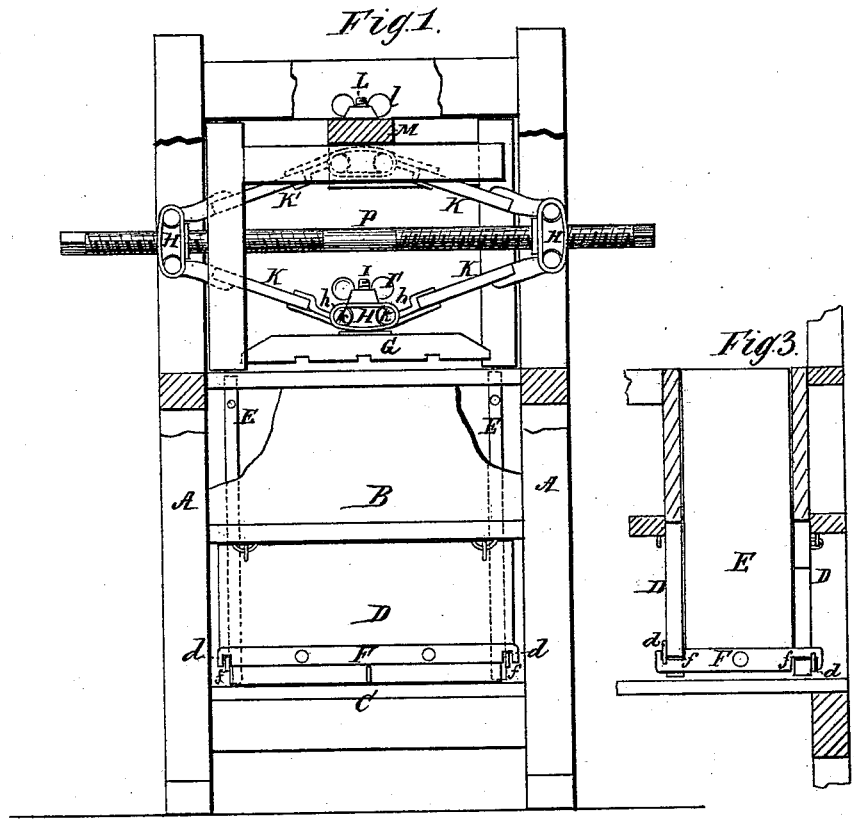
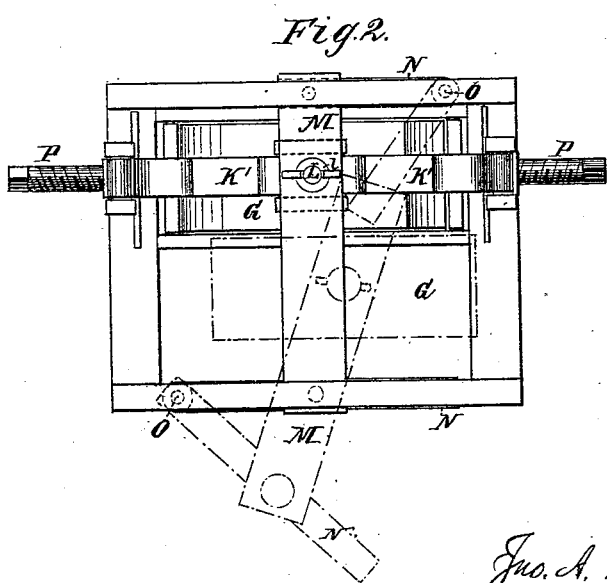
Witnesses:
G. Mathys.
Solon C. Kemon
Inventor:
Jno. A. McBryde
Per
Attorneys.

UNITED STATES PATENT OFFICE.

JOHN A. McBRYDE, OF LAURINBURG, NORTH CAROLINA.

IMPROVEMENT IN HAY AND COTTON PRESSES.

Specification forming part of Letters Patent No. 148,730, dated March 17, 1874; application filed February 17, 1874.

*To all whom it may concern:*

Be it known that I, JOHN A. MCBRYDE, of Laurinburg, in the county of Richmond and State of North Carolina, have invented a new and Improved Hay and Cotton Press; and I do hereby declare that the following is a full, clear, and exact description of the same, reference being had to the accompanying drawing forming a part of this specification, in which—

Figure 1 is a front or rear elevation, partly in section, Fig. 2 a plan view, Fig. 3 a sectional elevation, of press-box.

The invention relates to, and consists in, means for hanging and operating the follower of a hay or cotton press, so that it will always center itself upon the cotton or hay to make a bale of rectangular shape, and be conveniently moved off from the top of press-box to allow convenient access to the latter.

A is the frame, and B a press-box, fastened therein and resting on a platform, C. The press-box has two hinged doors, D D, on opposite sides, with the reversely end-notched and metal-plated extensions $d$ $d$ and $d'$ $d'$, its two edge boards E E being pivoted and provided with double and reversed catches $f$ $f$ on the same pivoted bar F. After the cotton has been compressed, the doors D D and edge-boards E E are swung open to allow the bale to be tied. G is the follower, which is connected with a bar, H, (having the hinge-eyes $h$,) by means of a screw, I, pivoted and held by a nut, I'. To this bar is pivoted the hinge-pintles $k$ of the arms K K, while the latter are pivoted to similar arms K' K' by a bar, H. The arms K' K' are again pivoted to a bar, H $h$, which is held by screw L and nut $l$ to a cross-bar, M. The cross-bar M is supported upon and pivoted to the two arms N N that are carried upon the upright pivoted and oscillating posts O O. The cranes N O enable the cross-bar M to be moved horizontally, thus carrying the follower out of the way when the cotton is to be inserted at the top. Through the opposite threaded bars H H works a right and left screw, P, which straightens or draws together the pivoted arms $k$ $k'$, according as the follower is to be carried downward or upward. By these means the follower has both horizontal and vertical play, so as to adjust itself conveniently to the cotton and (being centrally pressed by the arms as they approach each other) perfectly consolidates the cotton, and renders the compression uniform throughout its bulk.

Having thus described my invention, what I claim is—

1. The combination, with a cross-bar, M, that supports the follower, of a pair of cranes, N O, pivoted in the frame, as and for the purpose described.

2. The combination, with a press-follower and its supporting cross-bar, of the arms K K K' K', connected by and pivoted to bars H $h$ attached by screw and nut to cross-bar and follower, as and for the purpose set forth.

The above specification of my invention signed by me this 28th day of January, 1873.

J. A. McBRYDE.

Witnesses:
SOLON C. KEMON,
CHAS. A. PETTIT.